Patented June 11, 1946

2,402,061

UNITED STATES PATENT OFFICE 2,402,061

DICYANDIAMIDE-ALIPHATIC KETONE CONDENSATION PRODUCT

Alexander F. MacLean, Stamford, Conn., assignor to American Cyanamid Company, New York, N. Y., a corporation of Maine No Drawing. Application July 28, 1945, Serial No. 607,653

6 Claims. (Cl. 260—501)

This invention relates to a new class of compounds obtained by the reaction of dicyandiamide with aliphatic ketones of low molecular weight, more specifically acetone and methyl ethyl ketone, and to their methods of preparation.

I have found that condensation products having definite molecular composition and crystal structure are obtained by reacting dicyandiamide with acetone or with methyl ethyl ketone in the presence of strong monobasic acids. The reaction is carried out simply by mixing the ingredients in the proper molecular proportion or, preferably, by using an excess of the ketone as solvent for the dicyandiamide and the acid. When this is done a clear solution is first formed on mixing the three ingredients, but upon continued reaction the condensation products of the present invention separate out in a high degree of purity.

For reasons which I have not as yet determined, the only aliphatic ketones that will form condensation products with dicyandiamide of the type dealt with by the present invention are those of low molecular weight. Acetone and methyl ethyl ketone, the two lowest members of the series of aliphatic ketones, will form these condensation products in a high state of purity, and with good yields. Methyl isobutyl ketone and other ketones of higher molecular weight do not appear to react in the same manner, and do not form the same type of reaction products. Acetone and methyl ethyl ketone are therefore the only members of the class of lower aliphatic ketones that can be used in practising the present invention.

As is noted above, the products of the present invention are compounds of definite molecular composition. In their crystalline form they contain 2 molecular proportions of dicyandiamide for each mol of acetone or of methyl ethyl ketone together with 2 mols of the monobasic acid used in their preparation. They correspond to the formula:

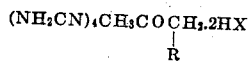

in which R is hydrogen or a methyl radical, depending on the ketone used, and X is the anion of a strong monobasic acid such as hydrochloric acid, hydrobromic acid, or an aliphatic or aromatic sulfonic acid such as ethane sulfonic acid or p-toluene sulfonic acid.

The new condensation products of my invention decompose in dilute neutral or slightly acid aqueous solutions into their components; i. e. the ketone, dicyandiamide, and acid used in their preparation. They may therefore be titrated with bases as a free acid, and their molecular weights determined. It was on this basis that the molecular weight of the above formula was calculated.

A remarkable result is obtained when the new compounds of my invention are dissolved in aqueous alkalis. Under these conditions they form an equimolecular mixture of melamine and a salt of cyanamide while liberating the ketone. Melamine can therefore be obtained in good yields from the new condensation products of the present invention without the necessity of resorting to high temperatures and pressures.

The invention will be described in greater detail by the following specific examples to which, however, it is not limited.

Example 1

420 grams (5 mols) of dicyandiamide was added to 1,200 grams (48 mols) of acetone together with 590 grams (5.9 mols) of 37% hydrochloric acid. The mixture was agitated for 2.3 hours at 15–30° C., during which time the reactants first went completely into solution and then formed a crystalline precipitate. 550 grams (1.82 mols) of product were obtained in this manner. The crystals were filtered off, washed with acetone, and analyzed. The analytical results were:

|        | Percent nitrogen | Percent carbon | Percent hydrogen | Percent chlorine |
|--------|------------------|----------------|------------------|------------------|
| Theory | 37.2             | 27.9           | 5.3              | 24.2             |
| Found  | 37.3             | 27.2           | 5.4              | 23.7             |

This analysis corresponds to the formula

Example 2

42 grams of dicyandiamide were stirred into a mixture of 120 grams of acetone and 17 grams of water, and gaseous HBr was introduced with continuous agitation. A total of 40 grams of HBr was added after which the mixture was agitated at 25° C. for 30 minutes, whereupon a crystalline reaction product was obtained. This was filtered off, washed with acetone, and dried under a vacuum at 30–50° C. The dried product, weighing 31 grams, had the composition

Example 3

Anhydrous p-toluenesulfonic acid was prepared by heating the monohydrate to 115° C. under 2 mm. of mercury absolute pressure. To 19 grams of the molten anhydrous acid there was added 35 cc of acetone, after which the solution was cooled to 55° C. 8.4 grams of dicyandiamide were then dissolved in the acidified acetone, the solution was agitated and cooled to 20° C., and the reaction product was filtered off, washed with methyl ethyl ketone and dried in a vacuum at 50° C. 23.1 grams of product were obtained having the composition:

|  | Percent carbon | Percent hydrogen | Percent nitrogen |
|---|---|---|---|
| Theory | 44.19 | 5.26 | 19.65 |
| Found | 45.5 | 5.3 | 20.6 |

The composition of the product was therefore $(H_2NCN)_4 \cdot (CH_3)_2CO \cdot 2HO_3SC_6H_4CH_3$.

*Example 4*

42 grams of p-toluenesulfonic acid monohydrate were dissolved in 50 cc of methyl ethyl ketone and 16.8 grams of dicyandiamide were then added. The mixture was agitated at 55° C. for 30 minutes and then cooled to 20° C., whereupon a crystalline product was formed. This was filtered off, washed with methyl ethyl ketone, and dried under a vacuum at 50° C. The dried product weighed 43.6 grams, this being a 75% yield based on the dicyandiamide used. Analysis gave the following results:

|  | Percent carbon | Percent hydrogen | Percent nitrogen |
|---|---|---|---|
| Theory | 45.21 | 5.48 | 19.15 |
| Found | 45.1 | 5.4 | 20.4 |

The formula of the product was $(H_2NCN)_4 \cdot CH_3 \cdot COCH_2CH_3 \cdot 2HO_3SC_6H_4CH_3)$

*Example 5*

84 grams of dicyandiamide were dissolved in 200 grams of acetone to which 10 grams of water had been added. HCl gas was then passed into the solution until a total of 34 grams was absorbed. The mixture was then agitated for a short period at room temperature and the crystalline product filtered off, washed and dried. The dried product weighed 141 grams which, based on the dicyandiamide used, was a 91% yield. Its composition was the same as that of the product of Example 1.

*Example 6*

160 grams (4 mols) of sodium hydroxide were dissolved in 800 grams of water and the solution was cooled to 25–30° C. During a period of about ½ hour, 150 grams of the tetracyanamide acetone dihydrochloride of Example 1 were added to this solution with vigorous agitation, care being taken to add the crystals evenly and slowly to avoid local acidification. Sufficient hydrochloric acid was then added to neutralize the remainder of the alkali, after which the resulting slurry was filtered. The solid product, weighing 53 grams, was identified as melamine by its appearance, by its melting point of 354° C., and by the characteristic gelatinous appearance of its picrate. Analysis showed it to contain 66.2% nitrogen, theory for melamine being 66.7.

The filtrate gave a yellow precipitate with silver salts and a black precipitate with copper salts, these being characteristic reactions of cyanamide. The amount of cyanamide was determined quantitatively in an aliquot portion and weighing the copper cyanamide formed. The result, when taken with the amount of melamine formed, showed the mechanism of the reaction to be as follows:

$(NH_2CN)_4 \cdot (CH_3)_2CO \cdot 2HCl + 3NaOH \rightarrow$
$C_3N_6H_6(\text{melamine}) + NaNHCN + 3H_2O + 2NaCl + (CH_3)_2CO$ On this basis the yield of melamine was 84% of theory.

What I claim is:

1. A condensation product of dicyandiamide and a lower aliphatic ketone selected from the group consisting of acetone and methyl ethyl ketone, said condensation product having the formula $(H_2NCN)_4 \cdot CH_3COCH_2 \cdot 2HX$
    |
    R in which R is hydrogen or a methyl group and X is the anion of a strong monobasic acid.

2. A condensation product of dicyandiamide and acetone having the formula $(H_2NCN)_4 \cdot CH_3COCH_3 \cdot 2HX$ in which X is the anion of a strong monobasic acid.

3. A condensation product of dicyandiamide and acetone having the formula $(H_2NCN)_4 \cdot CH_3COCH_3 \cdot 2HCl$ 4. A condensation product of dicyandiamide and acetone having the formula $(H_2NCN)_4 \cdot CH_3COCH_3 \cdot 2HO_3SC_6H_5CH_3$ 5. A method of preparing a compound of the formula $(H_2NCN)_4 \cdot CH_3COCH_2 \cdot 2HX$
    |
    R in which R is hydrogen or a methyl group and X is the anion of a strong monobasic acid which comprises dissolving dicyandiamide and a strong monobasic acid in a member of the group consisting of acetone and methyl ethyl ketone and recovering the reaction product.

6. A method of preparing a compound of the formula $(H_2NCN)_4 \cdot CH_3COCH_3 \cdot 2HX$ in which X is the anion of a strong monobasic acid which comprises dissolving dicyandiamide and a strong monobasic acid in acetone and recovering the reaction product.

ALEXANDER F. MacLEAN.